LOCAL TRANSMITTER FREQUENCY CONTROL CIRCUIT

Filed Nov. 18, 1944 2 Sheets-Sheet 1

INVENTORS
EMILE LABIN
SIDNEY FRANKEL
MARTIN SILVER

BY

R P Morris
ATTORNEY

June 9, 1953 E. LABIN ET AL 2,641,693

LOCAL TRANSMITTER FREQUENCY CONTROL CIRCUIT

Filed Nov. 18, 1944 2 Sheets-Sheet 2

INVENTORS
EMILE LABIN
SIDNEY FRANKEL
MARTIN SILVER

BY

R P Morris
ATTORNEY

Patented June 9, 1953 2,641,693

UNITED STATES PATENT OFFICE 2,641,693

LOCAL TRANSMITTER FREQUENCY CONTROL CIRCUIT

Emile Labin, New York, Sidney Frankel, Forest Hills, and Martin Silver, New York, N. Y., assignors to Federal Telephone and Radio Corporation, New York, N. Y., a corporation of Delaware Application November 18, 1944, Serial No. 564,140

12 Claims. (Cl. 250—17)

Figure 1:
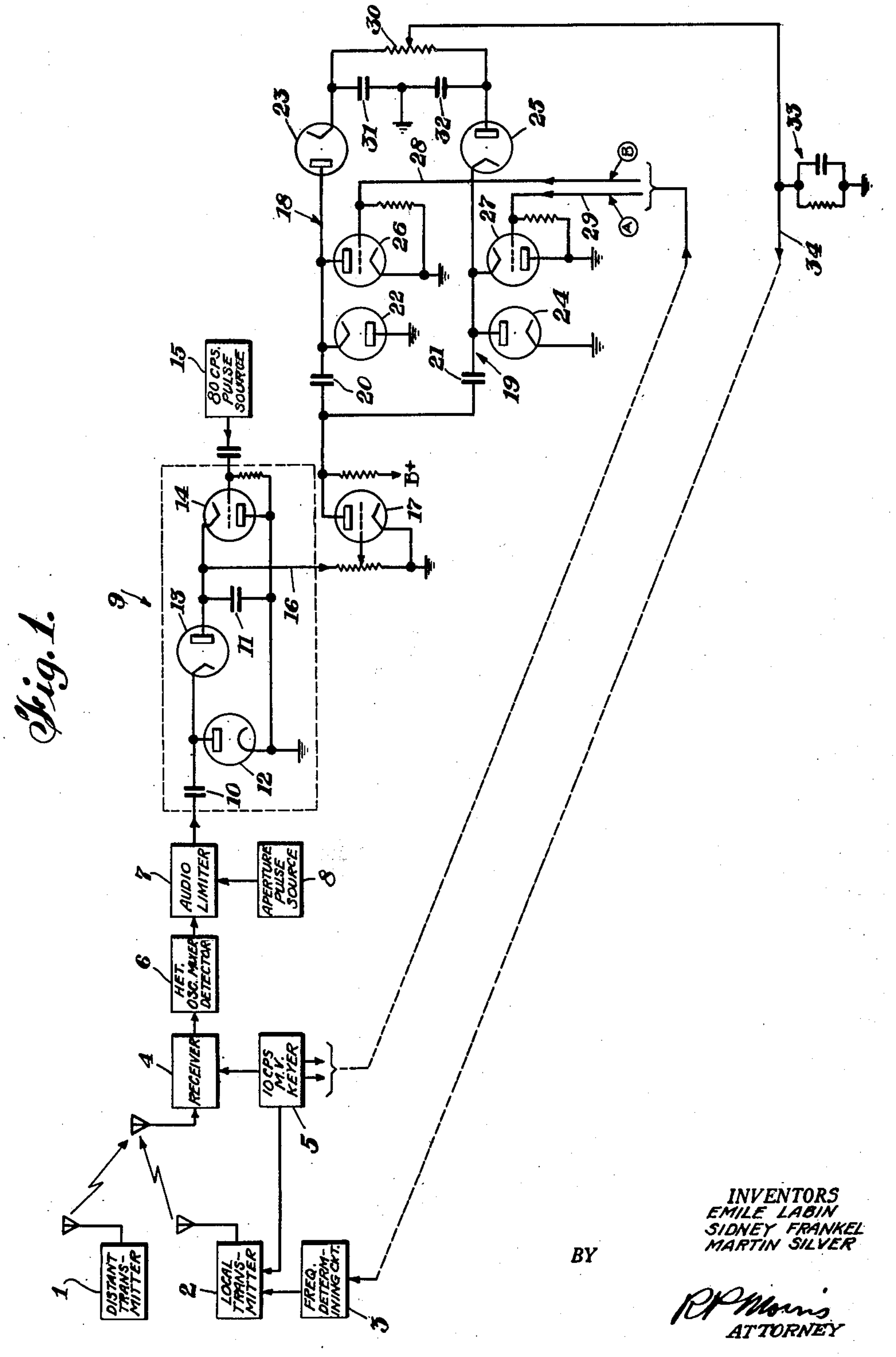

This invention relates to voltage controls, and more particularly to circuits for providing direct current voltages in accordance with the comparative value of the frequencies of two signals.

It is frequently desired to compare the frequencies of two sources, such as two transmitters for the purpose, for instance, of learning the relative frequency of one source as compared to another, as by the deviation thereof from a given standard frequency, or for the purpose of controlling the frequency of one signal by relating it with that of a given second signal.

The frequency of oscillation of an oscillating circuit may be controlled by means of a so-called reactance tube. In oscillating circuits of this type, the tunable circuit ordinarily incorporates as a part of its reactance a variable portion in the form of such a reactance tube. By applying a suitable controlling voltage to the grid or grids of the reactance tube the current in the plate circuit of the tube may be made to vary its phase relationship with respect to that of the tunable circuit of the oscillator, giving the same effect as though a variable inductance or capacitance were connected in the oscillator circuit. The frequency of the oscillator may thus be controlled by means of a signal on the grid of the reactance tube.

On the other hand it is possible, in accordance with the disclosure of the copending application of E. Labin Serial No. 554,408, filed September 16, 1944, and as will be explained in greater detail hereinbelow, to derive voltages which are proportional to a given frequency as related to a given standard frequency.

On the basis of the above, we propose to compare two frequencies and to utilize one frequency to control another.

Accordingly, it is an object of this invention to provide a circuit for furnishing a voltage as a function of the comparative value of two frequencies.

It is a further object of this invention to provide a circuit wherein the voltage depending on the comparative value of two frequencies is used to control one of the frequencies.

It is a still further object to provide a circuit to furnish a voltage which is a measure of the difference in the value of two frequencies.

It is another object to provide a circuit wherein the difference between each of the two frequencies with respect to a third or standard frequency is utilized for establishing the basis of comparison between the two frequencies.

It is another object to provide improved circuits for effecting the above named objects.

In accordance with our invention, we provide in connection with a radio frequency receiver adapted to respond to the two frequencies which are to be compared and suitably keyed for the alternate reception thereof, a heterodyning circuit designed to provide an audio frequency voltage wave indicative of the difference between the incoming signal frequency and the standard frequency of a local heterodyning oscillator. This audio frequency voltage wave, restricted to a short aperture or observation period is subjected to a cycle counting circuit which furnishes a voltage proportional to the number of cycles occurring during the said aperture period for each of the two signal frequencies. These two characteristic voltages are then differentially compared by means of two parallel circuits which each include a D. C. inserter and which are keyed in synchronism with the receiver. After combining the resultants of the two parallel circuits a direct current differential voltage is derived therefrom, the magnitude of which will be proportional to the difference between the two frequencies that are being compared. The D. C. voltage thus obtained is used to control the frequency determining circuit of an oscillator which is the source for the signal frequency which is to be controlled.

Figure 2:
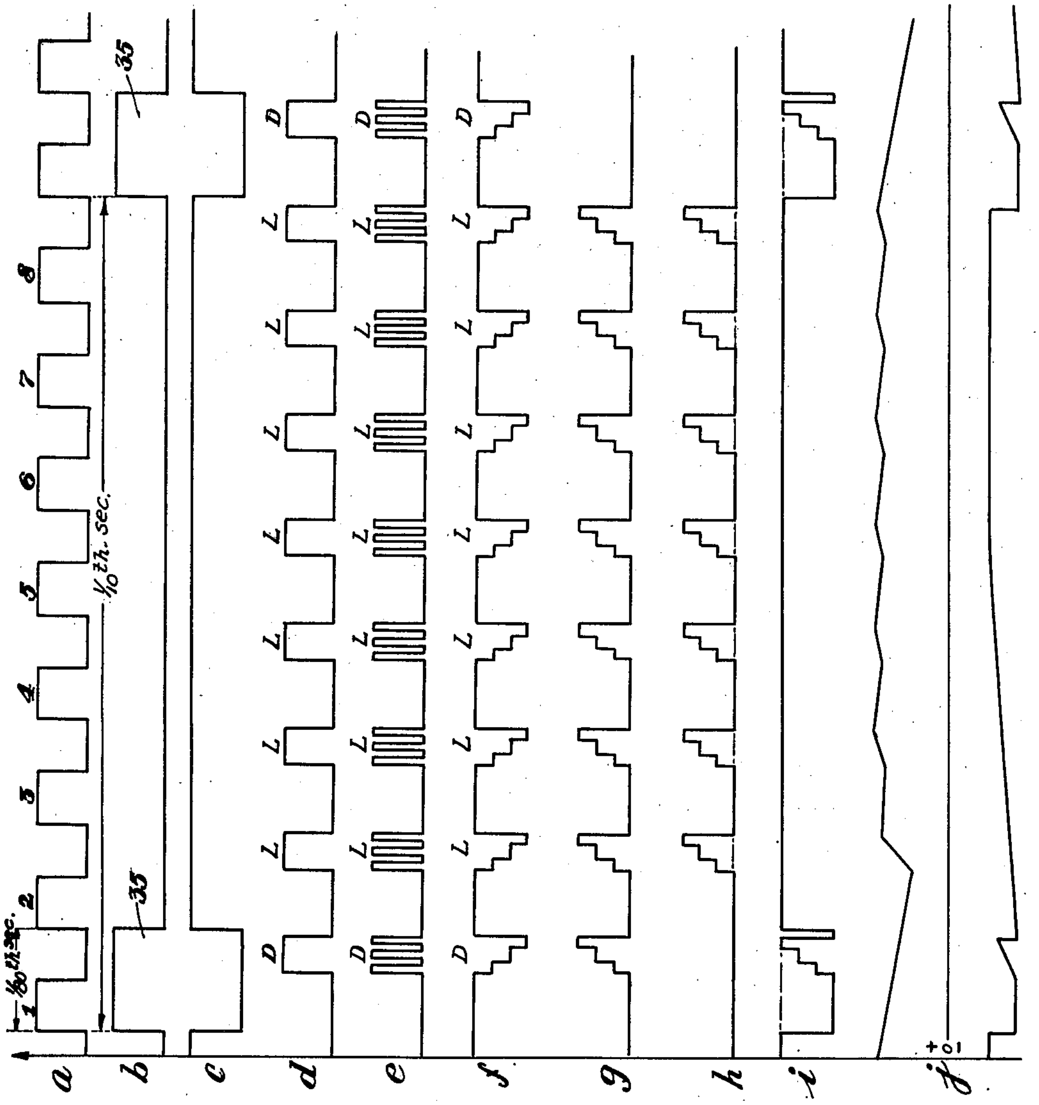

These and other features and objects will become apparent, as reference is had to the following detailed description to be read in connection with the accompanying drawings in which:

Fig. 1 is an illustration partly in block and partly in schematic form of a circuit in accordance with our invention; and Fig. 2 is a series of graphs illustrating the operation of the circuit in Fig. 1.

Referring to Fig. 1, the sources of the two signals having respectively the frequencies to be compared are illustratively represented by a distant transmitter 1 and a local transmitter 2. The frequency of the local transmitter is controlled by a frequency determining circuit 3 which may include a reactance tube modulator and which will be controlled by voltages obtained from a control circuit as will become apparent with the progress of the description. The two respective signal frequencies originating from transmitters 1 and 2 may be received by a receiver 4. The receiver circuit 4 is keyed for alternate reception of the signals from the transmitters 1 and 2 by means of a keyer circuit 5 which may be, for instance, a 10 cycle per second multi-vibrator and which may also be connected to control the local transmitter 2 whereby the latter is alternately keyed on and off to enable the receiver 4 to receive signals from transmitters 1 and 2 in rotation. The signals which come in at radio frequency may, as is standard practice, be heterodyned first to an intermediate frequency in the receiver circuit and subsequently heterodyned again to an audio frequency and detected by means of a heterodyne oscillator and mixer-detector circuit 6. The output of the circuit 6, which is in the form of unidirectional audio type voltage pulses is then applied to an audio limiter circuit 7 wherein the pulses are reduced to a common amplitude, and wherein the pulses as ultimately obtainable therefrom are restricted to a comparatively short interval of time by means of the application thereto of so-called aperture controlling pulses derived from an aperture pulse source 8. The audio pulses thus occurring during a given aperture interval are fed to a cycle counter circuit 9 which has been fully described in connection with Fig. 2 of the above-identified copending application by Emile Labin, Serial No. 554,408.

Without going into the details thereof, a brief description of the circuit will be given at this point. The counter circuit 9 is shown to consist of an input condenser 10 and an output condenser 11, the capacity of which is a multiple of that of the condenser 10. A rectifier type diode 12 is connected in such a way as to provide a path to ground for positive voltages of a given value from the output side of the condenser 10. A second diode 13 is connected to provide a path for negative voltages from the output side of the condenser 10 to the condenser 11, which latter is connected to ground at its output side. The condenser 11 is adapted to be short circuited by means of a triode 14, the anode of which is grounded, and the grid of which receives a control keying pulse from a pulse source 15, whereby the condenser 11 may be discharged periodically in accordance with the sequence of the keying pulses.

In a practical form, the pulse source 15 may furnish 80 pulses per second to the grid of the triode 14 as indicated in the wave form in graph *a* of Fig. 2. The connection of this counter circuit is such that the rectangular type audio pulses applied to the condenser 10 as derived from the audio limiter 7 will cause a charge thereon to be established approximating the potential of the pulses. Most of this charge will be automatically transferred to the larger condenser 11. The voltage on this larger condenser will be built up step by step to an overall value which corresponds to the number of the audio pulses. Each voltage step on this second, or counter condenser, will be larger than each successive step. The overall voltages thus established on the counter condenser 11, which are indicative of the number of pulses, that is, the number of cycles occurring during the aperture interval, for each of the signals, are then applied over a connection 16 to the grid of a buffer amplifier 17 which in turn feeds into two D. C. inserter channels 18 and 19 connected in parallel. Each of these inserters includes a blocking condenser, as at 20 and 21. The inserter channel 18 further includes a direct current restorer for positive voltages comprised of a diode 22 connecting the channel to ground by way of its anode, and of a second diode 23 for rectification of the positive pulsating voltage applied thereto, and which is connected for conducting positive voltages toward the output terminal of the circuit. Similarly, the channel 19 includes diodes 24 and 25 which, however, are connected respectively to insert and rectify negative voltages to be conducted toward the output terminal of the circuit. Each of the channels is also supplied with a triode 26 and 27, respectively, which are suitably connected to provide variable impedances for the respective channels to ground. Triodes 26 and 27 may be controlled by the application of suitable control voltages to their grids to lessen their respective impedances to ground. The ten cycle per second multi-vibrator circuit 5 may be utilized to furnish alternate pulses to the grids of these triodes 26 and 27 over connections 28 and 29, whereby channels 18 and 19, alternately, are substantially short circuited in synchronism with the reception of the two signal frequencies. The outputs obtainable from the rectifiers 23 and 25, respectively, are applied to an adjustable potentiometer 30, condensers 31 and 32 being provided in parallel with the potentiometer and connected to ground at their common terminal. The condensers 31 and 32 function such that the potentiometer receives only the peak values of the positive and negative voltages of the circuits 18 and 19, respectively. The balance of the two peak voltages from the potentiometer, after having its A. C. component filtered out in an R-C filter circuit 33, may then be applied to the frequency determining circuit 3 of the local transmitter 2 over connection 34 to control the frequency thereof.

In order to render the following explanation of the operation of the circuit more comprehensible, reference will be had to the graphical representations of Fig. 2. The keyer circuit 5, as already indicated, is adapted to control the operation of both the local transmitter 2 as well as the receiver circuit 4 by means of keying pulses occurring at the rate of ten times per second, such pulses in the examples illustrated in graphs *b* and *c* lasting for one-eightieth of a second. These pulses are applied in such a manner that the receiver may be enabled to receive signals from the distant transmitter 1 during one-eighth of the time, that is, for the duration of the pulse 35 in graph *b*, while during seven-eighths of the time, that is, in the interval between the pulses 35, the local transmitter may be received by stray coupling, other outside signals not being sufficient strong to overcome the effect of partial blocking in the receiver. Conversely, the local transmitter 2 is keyed in accordance with the pulse formation shown in graph *c*, wherefrom it is apparent that the transmitter 2 will be keyed off for the duration of the pulses 35 (graph *b*) and will be keyed on for the interval between the pulses 35. This arrangement makes it possible for the receiver to respond to the distant transmitter during the pulses 35, and to the local transmitter in the interval between pulses. The aperture or period of observation to which the audio frequency pulses are restricted and during which period they are counted, is shown in graph *d*, which is the envelope period of the groups of aperture pulses shown in graph *e*. It will be noticed that a pulse defining one such aperture or observation period occurs during each of the pulses 35 and seven such pulses in the interval between the pulses 35. When interpreting the pulses shown in the graphs of Fig. 2, it will, of course, be realized that the relative as well as the absolute value of the pulses shown is quite arbitrary and may be changed in number and extent to suit the specific purposes as the case may be. In graph *e* there is shown a series of pulse groups as they will be obtainable from the audio limiter circuit 7 during the aperture periods of graph *d* for the local and the distant transmitter respectively. Thus, the group of pulses in graph *e* having the reference D is due to the signal frequency of the distant transmitter, while the groups of pulses referred to by L are those due to the local transmitter as received by the receiver 4. The number of pulses of each of these groups corresponds to the number of cycles by which the respective signal frequency differs from the local heterodyning oscillator of the circuit 6 within the observation or aperture pulse as supplied by source 8. As already indicated above and disclosed in further detail in the copending application by Labin, Serial No. 554,408, the cycle counter circuit is effective in building up a voltage on condenser 11 in steps which correspond to the number of pulses in each of the groups of graph *e* and which voltage is applied for amplification to the buffer amplifier 17. The keying wave shown in graph *a*, as already brought out, is utilized to clear condenser 11 of its charge after each aperture pulse, that is, in this example, 80 times per second. The stepwise increases in voltage on the condenser 11, and the ultimate value thereof corresponding to the pulse groups of graph *e*, is indicated in graph *f*. The condenser voltage in accordance with pulsations shown in graph *f* is next applied to the grid of the buffer amplifier 17 which serves to prevent the remainder of the circuit from loading the counter circuit as well as to give a greater overall sensitivity by increasing the output voltage obtainable thereby. As the amplified counter voltage in the form shown in graph *g* is applied simultaneously to the inserter channels 18 and 19, the blocking condensers 20 and 21 serve to pass only the A. C. components thereof, while the combination of the D. C. restorer 22 and the rectifier 23 in the channel 18 functions to insert a D. C. component in the sense that the entire voltage wave acquires a positive polarity, and the inserter 24 and the rectifier 25 in the channel 19 are effective similarly in the opposite direction, giving the voltage wave in this channel a negative polarity. Thus, the pulsations of graph *f*, referred to by D, will appear on the negative side, and the pulsations L will appear on the positive side of a common zero reference line, as shown in graphs *h* and *i*. In synchronism with the keying of the receiver and of the local transmitter, as shown in graphs *b* and *c*, the two channels 18 and 19 are alternately substantially short circuited by means of the variable impedance keyer triodes 26 and 27 so that for each $\frac{1}{10}$ of a second there will be obtained seven counts of the local transmitter signal frequency and one count of the distant transmitter frequency. The capacitors 31 and 32 by being combined with the rectifiers 23 and 25 serve to even out the pulsations of the respective positive and negative voltages so that only the peak values thereof will appear in the potentiometer. The arrangement shown is such that the local transmitter count will result in a positive voltage from the channel 18 and the distant transmitter will result in a negative voltage through the channel 19, resulting in the type of waves substantially as shown in graph *j*. When combined in the potentiometer, a positive or negative resultant wave results, the A. C. components of which may then be removed by means of the R-C filter 33, and the resultant D. C. component, which is either positive or negative, depending on the deviation of one or the other frequency from a predetermined difference for which the potentiometer 30 has been adjusted to the zero output, may then be applied to the control grid of a suitable reactance tube modulator in the frequency determining circuit 3. It is thus possible to control the frequency of a given local oscillator to conform to the frequency of a given distant oscillator by means of the automatic frequency control as described.

While specific embodiments have been described, particularly with respect to the receiver and the counter circuits, as well as a specifically described frequency control of a local transmitter, it will be seen by these schooled in the art that other circuits are available to co-operate with the frequency controlling circuit of our invention. It will also be apparent that the application of the frequency comparison circuit to the control of frequency, is only one of a plurality of possible uses to which the circuit may be put. It is therefore to be understood that the apparatus and the applications thereof may be modified without departing from the scope of the invention, and that the form herein shown and described is to be regarded as illustrative of the invention only and not as limiting the objects thereof or the appended claims.

We claim:

1. A radio system for supplying a voltage indicative of the difference between two given alternately received frequencies, comprising a third frequency source, voltage deriving means including a cycle counter circuit for alternately mixing each of said given frequencies with said third frequency to provide in a given alternation two uni-directional voltages each proportional to a respective one of said given frequencies, and means for differentially combining said voltages whereby a resultant is obtained which is proportional to the difference between the first-mentioned two frequencies.

2. A radio system in accordance with claim 1, wherein said voltage deriving means includes a circuit for supplying aperture pulses for controlling the input to said cycle counter circuit.

3. A radio system for supplying a voltage indicative of the difference of two given frequencies, comprising means for providing in a given alternation two unidirectional voltages of the same polarity each proportional to a given one of said frequencies, means for translating said voltages into alternating voltages, means for adding unidirectional components to said alternating voltages to render them positive and negative respectively, means for differentially combining the peak values of said positive and said negative voltages into a resultant, and means for filtering out alternating current components from said resultant, whereby a unidirectional voltage is obtained which is proportional to the difference of the two frequencies.

4. A radio system in accordance with claim 3, wherein said means for adding uni-directional components to said alternating voltages comprises a direct current restorer circuit for each of said voltages.

5. A radio system in accordance with claim 3, wherein said means for combining voltages includes a comparator circuit.

6. For use with a source supplying alternately two unidirectional voltages having the same polarity, the combination comprising means for translating said voltages into alternating voltages, means for restoring unidirectional components into said alternating voltages to render them positive and negative respectively, means for differentially combining the peak values of said positive and said negative voltages into a resultant, and means for filtering out alternating current components from said resultant.

7. A radio system for controlling on signal frequency by means of another, comprising in combination, a source of signal frequency adapted to be controlled, a receiver for receiving a signal having said controllable frequency and a second signal having a given reference frequency, means for enabling said receiver for alternately receiving said controllable and said reference signal frequency, means associated with said receiver for supplying a third frequency and means associated with said receiver for supplying a voltage indicative of the difference between each of said signal frequencies with respect to said third frequency, means for differentially comparing the respective indicative voltages to provide a resultant voltage, and means for applying said resultant voltage to control said controllable frequency, said means for supplying voltage including a cycle counter circuit and a circuit for supplying an aperture control pulse to said receiver to limit the period of comparison between said respective signal frequencies and said third frequency.

8. A radio system for controlling one signal frequency by means of another, comprising in combination, a source of signal frequency adapted to be controlled, a receiver for receiving a signal having said controllable frequency and a second signal having a given reference frequency, means associated with said receiver for supplying a third frequency, means for enabling said receiver for alternately receiving said controllable and said reference signal frequency, means associated with said receiver, including a cycle counter circuit and a source for supplying limiting aperture pulses therefor, for supplying a unidirectional voltage having the same polarity for both signals, said voltages being indicative of the difference between each of said signal frequencies with respect to said third frequency, means for differentially comparing the respective indicative voltages to provide a resultant voltage, and means for applying said resultant voltage to control said controllable frequency.

9. A radio system in accordance with claim 7, wherein said means for comparing voltages includes circuit means for imparting an opposite polarity to each of the respective voltages with respect to the other, and a differential comparator circuit for combining said voltages of opposite polarity.

10. A method for controlling a first controllable frequency by means of a second given frequency with reference to a third frequency comprising the steps of alternately obtaining responses to said first and said second frequency, mixing said responses with a third frequency, deriving voltages for each of said signals from said responses, differentially combining said voltages, and utilizing the resultant of the last step to control said controllable frequency.

11. A method in accordance with claim 10, wherein said step of deriving includes counting the cycles of each of the two frequencies with respect to said third frequency.

12. A method in accordance with claim 10, wherein said step of combining includes the step of giving opposite polarities to said voltages.

EMILE LABIN.
SIDNEY FRANKEL.
MARTIN SILVER.

References Cited in the file of this patent

UNITED STATES PATENTS

| Number | Name | Date |
|---|---|---|
| 2,110,015 | Fitzgerald | Mar. 1, 1938 |
| 2,137,859 | Schwartz | Nov. 22, 1938 |
| 2,176,742 | La Pierre | Oct. 17, 1939 |
| 2,274,434 | Sheaffer | Feb. 24, 1942 |
| 2,294,942 | Varian et al. | Sept. 8, 1942 |
| 2,304,377 | Roberts | Dec. 8, 1942 |
| 2,307,316 | Wolff | Jan. 5, 1943 |
| 2,337,328 | Hathaway | Dec. 21, 1943 |
| 2,366,076 | Wilbur | Dec. 26, 1944 |
| 2,403,557 | Sanders | July 9, 1946 |
| 2,419,527 | Bartelink | Apr. 29, 1947 |
| 2,425,981 | Bard et al. | Aug. 19, 1947 |

FOREIGN PATENTS

| Number | Country | Date |
|---|---|---|
| 355,705 | Great Britain | Aug. 24, 1931 |